US006906684B2

(12) United States Patent
Turner

(10) Patent No.: US 6,906,684 B2
(45) Date of Patent: Jun. 14, 2005

(54) CONTROLLING A TELESCOPIC ANTENNA MAST

(75) Inventor: Christopher David Glenn Turner, Erie, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/696,787

(22) Filed: Oct. 30, 2003

(65) Prior Publication Data

US 2005/0093766 A1 May 5, 2005

(51) Int. Cl.[7] .......................... H01Q 9/30; H01Q 1/32; H01Q 1/12; H04B 1/04; H04B 1/18

(52) U.S. Cl. ....................... 343/900; 343/713; 343/715; 343/718; 343/902; 455/120; 455/125; 455/170.01; 455/172.1; 455/184.1; 455/222; 455/283; 455/296; 455/297

(58) Field of Search ................................ 343/713, 715, 343/718, 900, 902; 455/120, 125, 170.1, 172.1, 184.1, 222, 283, 296, 297

(56) References Cited

U.S. PATENT DOCUMENTS

| | | | | | |
|---|---|---|---|---|---|
| 2,834,012 | A | * | 5/1958 | Allen | 343/723 |
| 4,803,493 | A | * | 2/1989 | Jamison | 343/745 |
| 4,932,176 | A | * | 6/1990 | Roberts et al. | 52/118 |
| 5,164,739 | A | * | 11/1992 | Koide et al. | 343/901 |
| 5,865,390 | A | * | 2/1999 | Iveges | 242/375 |

* cited by examiner

*Primary Examiner*—Don Wong
*Assistant Examiner*—Leith A. Al-Nazer

(57) ABSTRACT

A receiver receives an electromagnetic signal via an antenna mounted on an antenna mast. A signal evaluator determines or measures a signal quality level associated with the received electromagnetic signal. The signal quality compares the determined signal quality level to a threshold minimum signal quality level. A current elevational position of the antenna mast is detected or tracked. The antenna mast is raised to a greater height than the current elevational position if the compared signal quality level is less than the threshold minimum signal quality level and if the current elevational position is less than a maximum height of the antenna mast.

23 Claims, 4 Drawing Sheets

CONTROLLING A TELESCOPIC ANTENNA MAST

FIELD OF THE INVENTION

This invention relates to a method and system of controlling a telescopic antenna mast.

BACKGROUND OF THE INVENTION

An antenna mast may be mounted on a vehicle to support the mounting of antenna. The antenna may be used for reception, transmission or both reception and transmission of an electromagnetic signal. The mast may be limited in height because of obstructions in the environment. Obstructions may include vegetation, vine canopies, tree canopies, bridges, traffic signals, buildings or otherwise. The limitation in height of the antenna may limit the maximum range of effective communications between the vehicle and a communications device located remotely apart from the vehicle. For example, electromagnetic radiation that is in the microwave frequency range may be limited to propagation in line-of-sight paths or may be severely attenuated by ground clutter where antenna height is insufficient for a requisite level of clearance. Accordingly, a need exists for maximizing the available antenna height of an antenna mast mounted on a vehicle to improve the range and reliability of communications.

SUMMARY OF THE INVENTION

A receiver receives an electromagnetic signal via an antenna mounted on an antenna mast. A signal evaluator measures or determines a signal quality level associated with the received electromagnetic signal. The signal evaluator compares the measured signal quality level to a threshold minimum signal quality level. A current elevational position of the antenna mast is detected or tracked. The antenna mast is raised to a greater height than the current elevational position if the measured signal quality level is less than the threshold minimum signal quality level and if the current elevational position is less than a maximum height of the antenna mast.

DESCRIPTION OF THE PREFERRED EMBODIMENT

Figure 1:
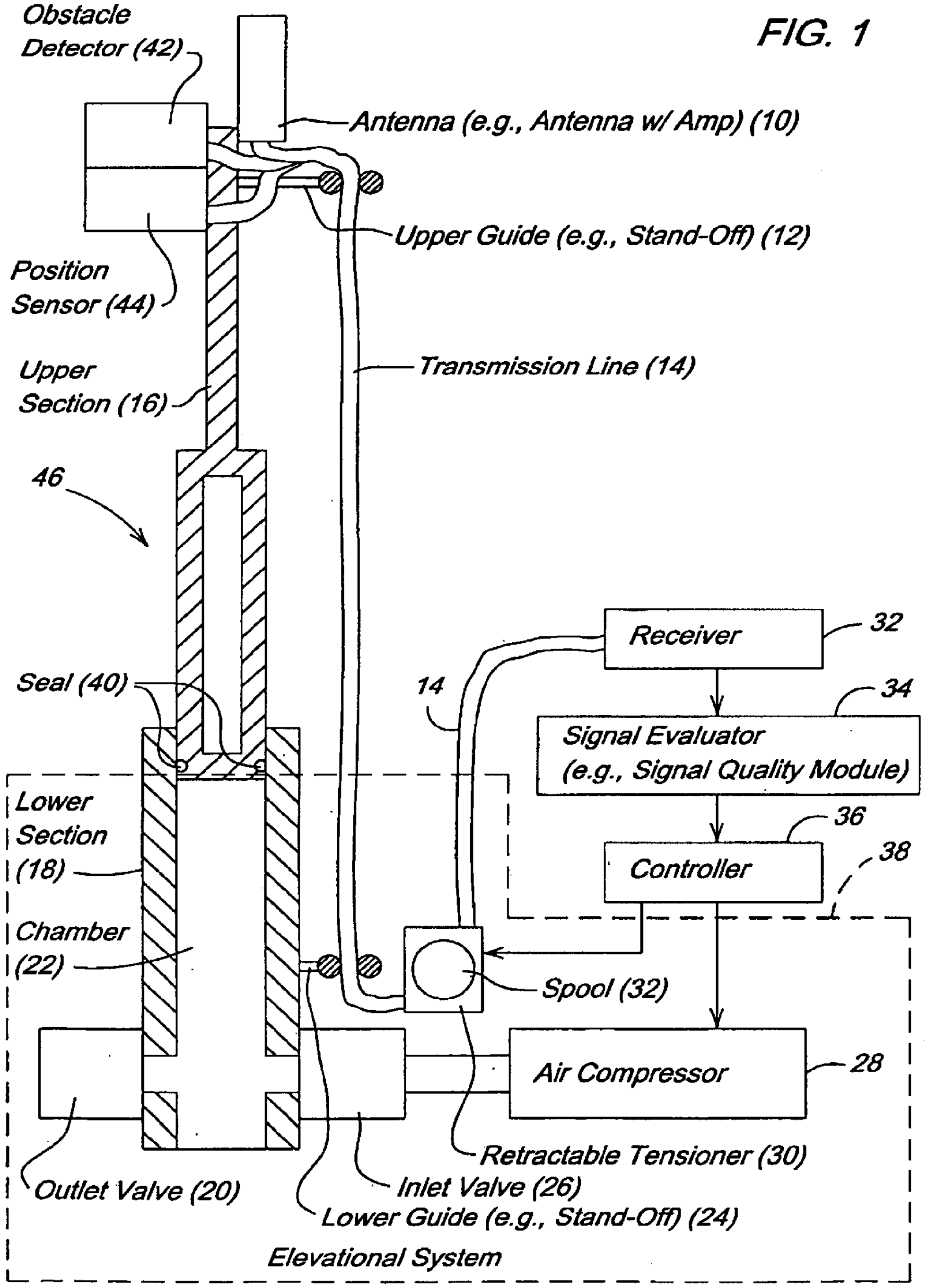
FIG. 1 is a block diagram of one embodiment of a system for controlling a telescopic antenna mast in accordance with the invention.

FIG. 1 illustrates an antenna mast assembly and a system for controlling an elevation of the antenna mast 46 to enhance communications between an antenna 10 mounted on the antenna mast 46 and another communications device spatially separated from the antenna 10.

The antenna mast assembly comprises an antenna mast 46, an antenna 10 mounted thereon, transmission line 14 coupled to the antenna 10, and one or more transmission line guides (12, 24) for supporting the transmission line 14. The antenna mast 46 includes multiple sections. For example, the antenna mast 46 includes at least a first section (e.g., upper section 16) and a second section (e.g., lower section 18). Each section may have a generally circular, elliptical, triangular, rectangular cross section or a cross section of another shape that interlocks or slidably engages at least one adjacent section. Although the antenna mast 46 may be of virtually any height that can be carried by a vehicle and supported stably thereby when completely erected, in one embodiment the antenna mast 46 adjusts from a height of approximately 1 meter to approximately 10 meters. The height or current elevational position, minimum height, and maximum height of the antenna mast 46 may be defined with reference to the vehicle or a fixed point on the vehicle, for example.

The transmission line guides may include an upper guide 12 and a lower guide 24. The upper guide 12 and the lower guide 24 are fastened to the antenna mast 46. The upper guide 12 retains or secures at least a portion of the transmission line 14. The lower guide 24 may include rollers, rotatable spherical members, a recess, a hole or another interface that allows for retention and generally vertical movement of the transmission line 14 relative to the lower guide 24. The transmission line 14 or other transmission lines may support, carry or multiplex signals (e.g., direct current, radio frequency or otherwise) associated with the receiver 32, a transmitter, a transceiver, a tower-top amplifier, a tower-top power transmitting amplifier, an obstacle detector 42, and a position sensor 44.

The system for controlling an antenna mast 46 comprises a receiver 32 coupled to the transmission line 14 associated with the antenna 10. The receiver 32 is coupled to a signal evaluator 34 (e.g., a signal quality module). In turn, the signal evaluator 34 provides a signal quality indicator to the controller 36. The controller 36 is coupled to an elevational system 38. The controller 36 outputs control data or a control signal responsive to the signal quality indicator.

In one embodiment, the elevational system 38 comprises an air compressor 28 for feeding and pressurizing a chamber 22 within the mast 16 with air or an inert gas. An inlet valve 26, an outlet valve 20, and seals 40 are associated with the chamber 22 within the antenna mast 46. The chamber 22 receives compressed air or an inert compressed gas via the inlet valve 26 from the air compressor to raise or maintain a peak height of the antenna mast 46, while the outlet valve 20 and the seals 40 cooperate to make the chamber 22 generally air-tight or substantially hermetically sealed. Once the chamber 22 is pressurized to a target pressure to maintain a desired height of the antenna mast 46, the inlet valve may be closed 26. To lower the height of the antenna mast 46 that is not fully lowered, compressed air or inert compressed gas may be released or bled from the chamber 22 via an outlet valve 20.

To support raising and lowering of the antenna mast 46, the elevational system 38 further comprises a retractable tensioner 30 for receiving or releasing the transmission line 14. In one configuration, the retractable tensioner 30 comprises a reel or spool 32 upon which the transmission line 14 is wound to a great extent when the antenna mast is fully lowered and to a lesser extent (or not at all) when the antenna mast is fully raised. The spool 32 may be spring-loaded to retract the transmission line 14 and a releasable ratchet mechanism (e.g., a generally circular gear with teeth, the gear mounted coaxially to the spool, where the teeth engage a movable pawl) may prevent the spool from moving when the tower is elevated above its lowest height.

The receiver 32 receives an electromagnetic signal via an antenna 10 mounted on an antenna mast 46. The received signal is carried by the transmission line 14 to the receiver 32.

A signal evaluator 34 measures or determines a signal quality level associated with the received electromagnetic signal. The signal evaluator 34 is arranged to compare the measured signal quality level to a threshold minimum signal quality level. The user or a technician may establish the threshold minimum signal quality based on one or more of the following: (1) target reliability (e.g., 99.9% reliability) or target availability of communications (e.g. reception, transmission or both) for the antenna and associated communications equipment, (2) a maximum bit-error rate for digitally modulated signals, (3) a minimum signal-to-noise ratio, and (4) a minimum signal strength. The threshold minimum signal quality may vary with the environment or location of the vehicle and may vary over time, such that time-averaged readings of the measured signal are used for signal quality determinations. In one embodiment, the signal quality comprises the measured signal-to-noise ratio of the received signal and the minimum signal quality level comprises a minimum signal-to-noise ratio defined by a user or technician. In another embodiment,the signal quality comprises signal strength of the received signal, and the minimum signal quality level comprises a minimum signal strength defined by a user or technician.

A position sensor 44 detects a current elevational position or current peak height of the antenna mast 46. The positional sensor 44 may represent a tower-mounted optical ranging device that measures a distance at or near its tower position to a fixed point at the base of the antenna mast 46. Alternately, the positional sensor 44 may be associated with monitoring the forward and reverse rotations (e.g., and including fractional rotations) of the spool 32 to estimate the height of the antenna mast 46.

In one example, an obstacle detector 42 detects an obstacle (e.g., an object) in a clearance zone above and about the antenna mast 46. In one embodiment, the obstacle detector 42 comprises an ultrasonic transmitter that emits a directional ultrasonic transmission or pulse and an ultrasonic receiver that is arranged to receive any reflected pulse from an obstacle within a certain range of the obstacle detector 42. In another embodiment, the obstacle detector 42 may comprise one or more of the following: an ultrasonic detector, an optical sensor, a tactile sensor, and/or a metal detection circuit. The metal detection circuit might be used to detect the presence of over-head wires, cables or telephone lines that might interfere with the operation of the antenna mast 46.

In one example, an elevational system 38 raises the antenna mast 46 to a greater height than the current elevational position if the measured signal quality level is less than the threshold minimum signal quality level and if the current elevational position is less than a maximum height of the antenna mast 46. In another example, the elevational system 38 lowers the antenna mast 46 at a proper height that avoids physical contact or interference with an obstacle upon detection of an obstacle within the clearance zone. In yet another example, a controller 36 prohibits the raising of the antenna mast 46 until the obstacle is no longer present in the clearance zone.

Although the elevational system 38 of FIG. 1 comprises a pneumatic device or an air compressor 28, the elevation system 38 may be associated with one or more of the following components: a pressurized tank of air, a pressurized tank of inert gas, a hydraulic pump, a hydraulic device, and a mechanical device.

Figure 2:
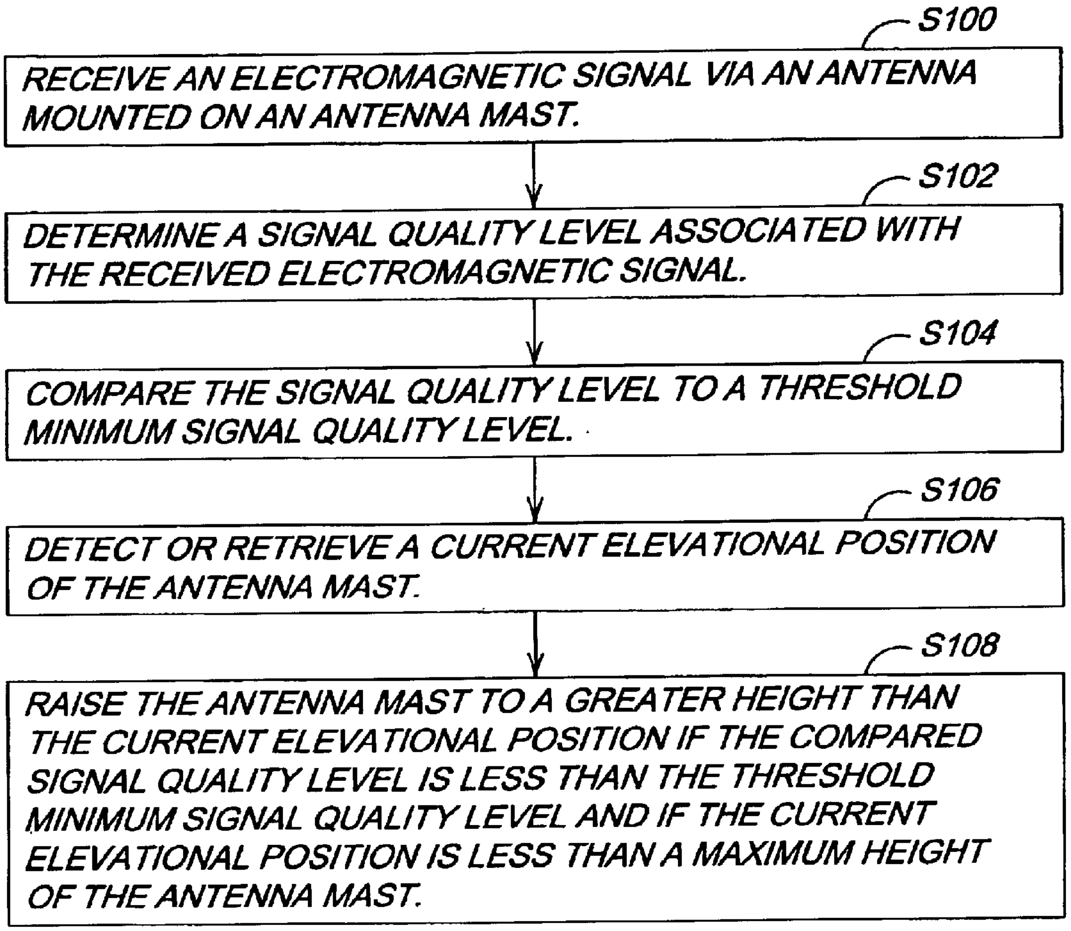
FIG. 2 is a flow chart of a first example of a method for controlling a telescopic antenna mast in accordance with the invention.

FIG. 2 is a flow chart of a first example of a method for controlling a telescopic antenna mast 46 that is associated with or mounted on a vehicle. The method of FIG. 2 begins with step S100.

In step S100, a receiver 32 receives an electromagnetic signal via an antenna 10 mounted on an antenna mast 46. For example, the receiver 32 receives a radio frequency or microwave signal via the antenna 10 and the transmission line 14.

In step S102, a signal evaluator 34 measures or determines a signal quality level associated with the received electromagnetic signal. The measured signal quality may be defined in terms of a bit-error rate, a maximum bit-error-rate, percentage of reliability, an availability, a signal-to-noise ratio, and a signal strength.

In step S104, the signal evaluator 34 compares the signal quality level to a threshold minimum signal quality level. Step S104 may be carried out in accordance with various definitions of the minimum signal quality level. In accordance with one definition, the minimum signal quality level comprises a minimum signal-to-noise ratio. In accordance with another definition, the minimum signal quality level comprises a minimum signal strength. In accordance with another definition, the minimum signal quality means a maximum bit-error-rate of a digitally modulated signal. The signal evaluator 34 may provide a status datum and a corresponding time-stamp indicated whether or not the measured signal quality data is compliant with the threshold minimum signal quality level during a certain window of time.

In step S106, a position detector or tracking device detects a current elevational position of the antenna mast 46. For example, the position detector may record or tabulate the latest or most up-to-date mast height of the antenna mast 46 at regular intervals and/or after each generally vertical movement of the antenna mast 46.

In step S108, an elevational system 38 or controller 36 raises the antenna mast 46 to a greater height than the current elevational position if the compared signal quality level is less than the threshold minimum signal quality level and if the current elevational position is less than a maximum height of the antenna mast 46. The received signal is noncompliant if the measured signal quality is less than the threshold minimum signal quality or target signal quality. The raising, lowering or maintenance of an elevation or height of the antenna mast 46 is accomplished by pneumatically, hydraulically or mechanically applying force to one or more slidably movable sections of the antenna mast 46.

Following step S108 or during step S108, the method of FIG. 2 may be supplemented by additional procedures related to the detection of an obstacle with respect to the antenna mast 46. In accordance with a first procedure, an obstacle detector 42 detects or attempts to detect an obstacle in a clearance zone above and around the antenna mast 46. Further, the controller or the elevational system lowers or maintains the antenna mast 46 upon detection of an obstacle within the clearance zone.

In accordance with a second procedure, an obstacle detector 42 detects an obstacle in a clearance zone above or around the antenna mast 46. The controller or the elevational system prohibits the raising of the antenna mast 46 until the obstacle is no longer present in the clearance zone. The clearance zone may be defined as a generally cylindrical zone extending about a vertical longitudinal axis of the mast 46. Further, the clearance zone may extend above the highest point of the antenna mast 46 by a fixed amount based on the tolerance and accuracy of the obstacle detector 42.

The method of FIG. 2 has wide application to mobile antenna masts 46 associated with vehicles. For example, the antenna mast 46 may be used to remote control operation of a vehicle on which the antenna mast 46 is mounted from a greater range or with greater reliability than otherwise possible. Environmental obstructions and physical effects on propagation may detract from reliability.

Figure 3:
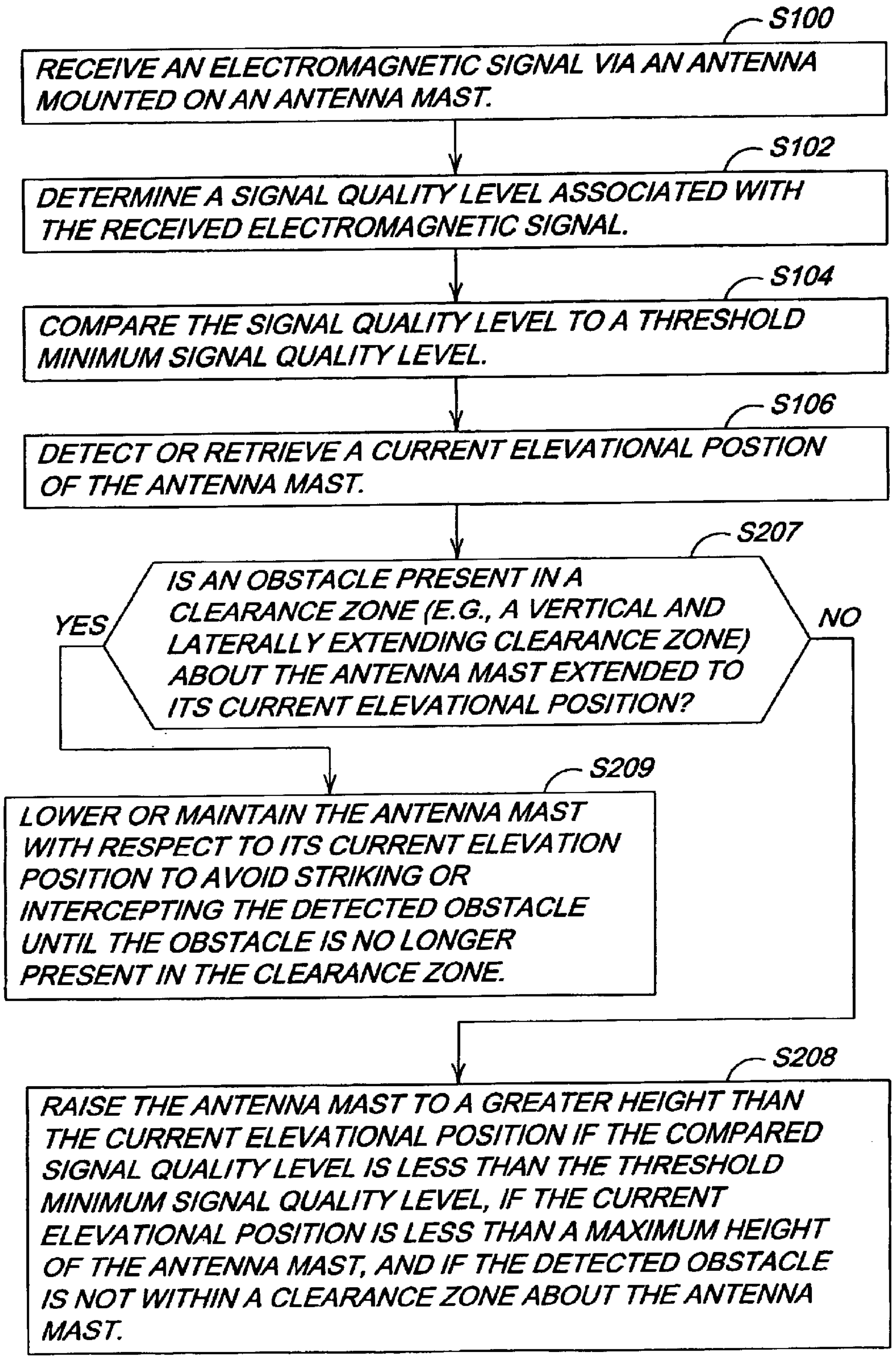
FIG. 3 is a flow chart of a second example of a method for controlling a telescopic antenna mast in accordance with the invention.

FIG. 3 is a flow chart of a second example of a method for controlling a telescopic antenna mast 46 that is associated with or mounted on a vehicle. The method of FIG. 3 begins with step S100. The method of FIG. 3 is similar to the method of FIG. 2, except the method of FIG. 3 includes new step S207, new step S209, and replaces step S108 with step S208. Like reference numbers in FIG. 2 and FIG. 3 indicate like procedures or steps.

Before, during or after step S106, step S207 is executed. In step S207, the obstacle detector 42 detects whether an obstacle is present about clearance zone of the antenna mast 46 in the current elevation position. The clearance zone may be defined as including a vertical clearance zone above the current highest point of the antenna mast 46, a cylindrical clearance zone about a vertical longitudinal axis of the antenna mast 46, and a direction-of-travel zone that extends in the direction of travel of the vehicle. For example, the direction-of-travel zone may extend as a generally planar or generally rectangular shape with a height equal or greater than the peak antenna mast height from the cylindrical zone in the direction of the heading of the vehicle. The distance that the direction of travel zone extends away from the vehicle is proportional to the speed and acceleration of the vehicle. If the vehicle adheres to a path plan, the present and future speed, heading, and acceleration may be known. The obstacle detector 42 may be mounted on the antenna mast 46, but need not be mounted on the antenna mast 46. If the obstacle detector 42 does not detect an obstacle in the clearance zone in step S207, the method continues with step S208. S106, However, if the obstacle detector 42 detects an obstacle in the clearance zone, the method continues in step S209.

In step S208, the elevational system or the controller raises the antenna mast 46 to a greater height than the current elevational position if the following three conditions are satisfied: (1) the compared signal quality level is less than the threshold minimum signal quality level, (2) the current elevational position is less than a maximum height of the antenna mast 46, and (3) the detected obstacle is not within a clearance zone about the antenna mast 46.

In step S209, the controller 36 or the elevational system 38 maintains or lowers the antenna mast 46 such that the peak height of the antenna mast does not contact, strike, collide, intercept or mechanically interfere with the obstacle upon detection of an obstacle within the clearance zone. Further, the controller 36 may prohibit the raising of the antenna mast 46 until the obstacle is no longer present in the clearance zone, regardless of the measured or determined signal quality level of step S102. The method of FIG. 3 may be applied to using the antenna mast 46 to remote control operation of a vehicle on which the antenna mast 46 is mounted. The raising, lowering or maintenance of the height or elevation of the antenna mast 46 is accomplished by pneumatically, hydraulically or mechanically applying force to one or more sections of the antenna mast 46.

Figure 4:
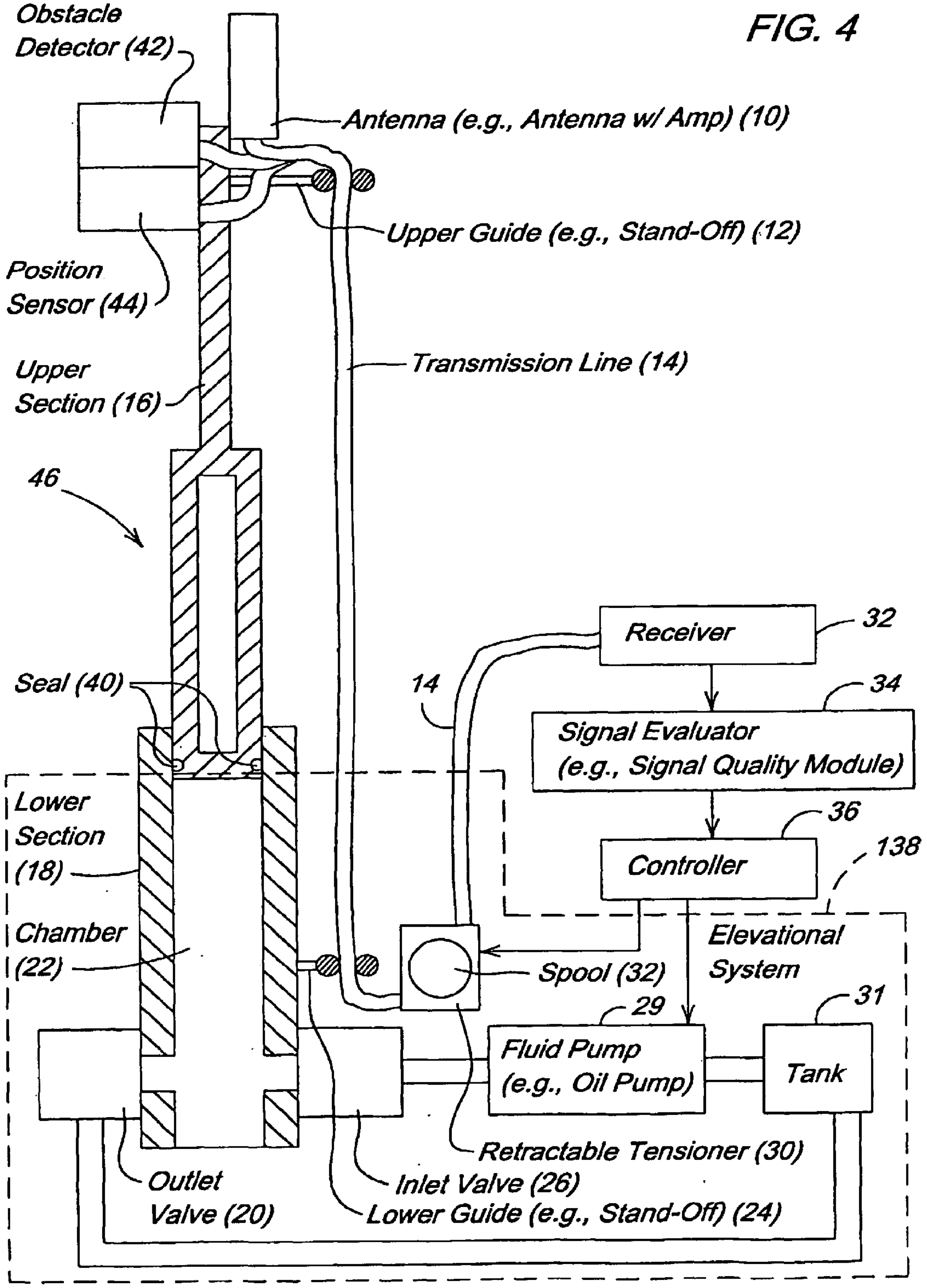
FIG. 4 is a block diagram of another embodiment of a system for controlling a telescopic antenna mast in accordance with the invention.

The configuration of FIG. 4 is similar to the configuration of FIG. 1, except the elevational system 38 of FIG. 1 differs from the elevational system 138 of FIG. 4. In particular, FIG. 1 represents a pneumatic configuration of the elevational system 38, whereas FIG. 4 represents a hydraulic configuration of the elevational system 138. The pneumatic configuration may be better suited for lower, lighter antenna masts or antenna masts with lighter wind-loading than the hydraulic configuration. The pneumatic configuration may support, but does not necessarily support, quicker movement of mast sections to their desired positions than the hydraulic counterpart. Like reference numbers in FIG. 1 and FIG. 4 indicate like elements.

The elevational system 138 of FIG. 4 comprises a fluid pump 29 (e.g., oil pump or hydraulic pump) coupled to an inlet valve 26. The fluid pump 29 is configured to pump or pressurize hydraulic fluid with sufficient pressure to raise or maintain a position of an upper section 16 of the antenna mast 46 with respect to a lower section 18. If or when the antenna mast 46 is lowered, hydraulic fluid may be bled via the output valve 20 into a tank 31. The tank 31 provides hydraulic fluid to the fluid pump 29. Accordingly, hydraulic fluid is circulated and recovered in a closed-loop containment system. The seals 40 between the exterior surface of the upper section 16 and the interior surface of the lower section 18 are configured to seal 40 a maximum design pressure of the hydraulic fluid.

Having described the preferred embodiment, it will become apparent that various modification can be made without departing from the scope of the invention as defined in the accompanying claims.

What is claimed is:

1. A method for controlling an antenna mast comprising:

receiving an electromagnetic signal via an antenna mounted on an antenna mast;

determining a signal quality level associated with the received electromagnetic signal;

comparing the signal quality level to a threshold minimum signal quality level;

detecting a current elevational position of the antenna mast;

raising the antenna mast to a greater height than the current elevational position if the compared signal quality level is less than the threshold minimum signal quality level and if the current elevational position is less than a maximum height of the antenna mast.

2. The method according to claim 1 wherein the signal quality comprises a determined signal-to-noise ratio and the minimum signal quality level comprises a minimum signal-to-noise ratio.

3. The method according to claim 1 wherein the signal quality comprises a determined signal strength and the minimum signal quality level comprises a minimum signal strength.

4. The method according to claim 1 wherein the signal quality comprises a determined bit-error rate and the minimum signal quality level comprises a maximum bit-error rate.

5. The method according to claim 1 further comprising:

detecting an obstacle in a clearance zone above and laterally about the antenna mast;

lowering the antenna mast upon detection of an obstacle within the clearance zone.

6. The method according to claim 1 further comprising:

detecting an obstacle in a clearance zone above and about the antenna mast;

prohibiting the raising of the antenna mast until the obstacle is no longer present in the clearance zone.

7. The method according to claim 1 further comprising:

using the antenna mast to remote control operation of a vehicle on which the antenna mast is mounted.

8. The method according to claim 1 further wherein the raising of the antenna mast is accomplished by pneumatically, hydraulically or mechanically applying force to one or more sections of the antenna mast.

9. A method for controlling an antenna mast comprising:

receiving an electromagnetic signal via an antenna mounted on an antenna mast;

determining a signal quality level associated with the received electromagnetic signal;

comparing the signal quality level to a threshold minimum signal quality level;

detecting a current elevational position of the antenna mast;

detecting if an obstacle is present within a clearance zone associated with the antenna mast in the current elevation position; and raising the antenna mast to a greater height than the current elevational position if the compared signal quality level is less than the threshold minimum signal quality level, if the current elevational position is less than a maximum height of the antenna mast, and if the detected obstacle is not within the clearance zone about the antenna mast.

10. The method according to claim 9 wherein the signal quality comprises a measured signal-to-noise ratio and the minimum signal quality level comprises a minimum signal-to-noise ratio.

11. The method according to claim 9 wherein the signal quality comprises a signal strength and the minimum signal quality level comprises a minimum signal strength.

12. The method according to claim 9 wherein the signal quality comprises a determined bit-error rate and the minimum signal quality level comprises a maximum bit-error rate.

13. The method according to claim 9 further comprising:

detecting an obstacle in a clearance zone above and about the antenna mast;

lowering the antenna mast upon detection of an obstacle within the clearance zone.

14. The method according to claim 9 further comprising:

detecting an obstacle in a clearance zone above and about the antenna mast;

prohibiting the raising of the antenna mast until the obstacle is no longer present in the clearance zone.

15. The method according to claim 9 further comprising:

using the antenna mast to remote control operation of a vehicle on which the antenna mast is mounted.

16. The method according to claim 9 further wherein the raising of the antenna mast is accomplished by pneumatically, hydraulically or mechanically applying force to one or more sections of the antenna mast.

17. A system for controlling an antenna mast comprising:

a receiver for receiving an electromagnetic signal via an antenna mounted on an antenna mast;

a signal evaluator for determining a signal quality level associated with the received electromagnetic signal, the signal evaluator arranged to compare the signal quality level to a threshold minimum signal quality level;

a position sensor for detecting a current elevational position of the antenna mast; and an elevational system for raising the antenna mast to a greater height than the current elevational position if the compared signal quality level is less than the threshold minimum signal quality level and if the current elevational position is less than a maximum height of the antenna mast.

18. The system according to claim 17 wherein the signal-to-noise ratio comprises the signal quality and the minimum signal quality level comprises a minimum signal-to-noise ratio.

19. The system according to claim 17 wherein signal strength comprises the signal quality and the minimum signal quality level comprises a minimum signal strength.

20. The system according to claim 17 further comprising:

an obstacle detector for detecting an obstacle in a clearance zone above and about the antenna mast;

the elevational system lowering the antenna mast upon detection of an obstacle within the clearance zone.

21. The system according to claim 17 further comprising:

an obstacle detector for detecting an obstacle in a clearance zone above and about the antenna mast;

a controller for prohibiting the raising of the antenna mast until the obstacle is no longer present in the clearance zone.

22. The system according to claim 17 further wherein the elevational system comprises one of the following: a pneumatic device, an air compressor, a pressurized tank of air, a pressurized tank of inert gas, a hydraulic pump, and a hydraulic device.

23. A system for controlling an antenna mast comprising:

a receiver for receiving an electromagnetic signal via an antenna mounted on an antenna mast;

a signal evaluator for determining a signal quality level associated with the received electromagnetic signal;

comparing the signal quality level to a threshold minimum signal quality level;

a position sensor for detecting a current elevational position of the antenna mast;

an obstacle detector for detecting if an obstacle is present above the antenna mast in the current elevation position; and an elevational system for raising the antenna mast to a greater height than the current elevational position if the compared signal quality level is less than the threshold minimum signal quality level, if the current elevational position is less than a maximum height of the antenna mast, and if the detected obstacle is not within a clearance zone about the antenna mast.

* * * * *